United States Patent
Grasböck et al.

(10) Patent No.: US 12,231,059 B2
(45) Date of Patent: Feb. 18, 2025

(54) METHOD FOR CONTROLLING A MULTILEVEL INVERTER WITH A SPLIT DC LINK

(71) Applicant: Fronius International GmbH, Pettenbach (AT)

(72) Inventors: Richard Grasböck, Wels-Thalheim (AT); Michael Rothboeck, Wels-Thalheim (AT); Roland Pieler, Wels-Thalheim (AT); Harald Kreuzer, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 227 days.

(21) Appl. No.: 17/919,294

(22) PCT Filed: Apr. 19, 2021

(86) PCT No.: PCT/EP2021/060011
§ 371 (c)(1),
(2) Date: Oct. 17, 2022

(87) PCT Pub. No.: WO2021/213947
PCT Pub. Date: Oct. 28, 2021

(65) Prior Publication Data
US 2023/0198421 A1     Jun. 22, 2023

(30) Foreign Application Priority Data
Apr. 20, 2020   (EP) ..................................... 20170373

(51) Int. Cl.
*H02M 7/483*     (2007.01)
*H02M 1/08*      (2006.01)
*H02M 7/487*     (2007.01)

(52) U.S. Cl.
CPC ........... *H02M 7/4833* (2021.05); *H02M 1/08* (2013.01); *H02M 7/487* (2013.01)

(58) Field of Classification Search
CPC ..... H02M 7/483; H02M 7/4833; H02M 7/487
See application file for complete search history.

(56) References Cited

U.S. PATENT DOCUMENTS

| 5,627,742 A   | * | 5/1997 | Nakata ................. | H02M 7/4833 |
| | | | | 363/41 |
| 2015/0198638 A1 | * | 7/2015 | Heikkila ................. | H02P 21/22 |
| | | | | 702/60 |

(Continued)

FOREIGN PATENT DOCUMENTS

| DE | 43 10 785 | 6/1994 |
| EP | 0 642 212 | 3/1995 |
| EP | 2 876 793 | 5/2015 |

OTHER PUBLICATIONS

Akagi H et al., "Voltage Balancing Control for a Three-Level Diode-Clamped Converter in a Medium-Voltage Transformerless Hybrid Active Filter", IEEE Transactions on Power Electronics, Institute of Electrical and Electronics Engineers, USA, vol. 24, No. 3, XP011254628, ISSN: 0885-8993, Mar. 1, 2009, pp. 571-579.

(Continued)

*Primary Examiner* — Gary L Laxton
(74) *Attorney, Agent, or Firm* — GREENBLUM & BERNSTEIN, P.L.C.

(57) ABSTRACT

To improve voltage balancing at the DC link capacitor voltages of a multi-level inverter with a split DC link a modulation signal with a modulation signal amplitude as even harmonic signal of the output voltage or output current of the inverter is calculated from an actual electric power difference of the actual electric powers at the DC link (Continued)

capacitors and is superimposed onto the setpoint value for setting an output voltage or output current of the inverter.

13 Claims, 3 Drawing Sheets

(56) References Cited

U.S. PATENT DOCUMENTS

2015/0303826 A1* 10/2015 Arnedo .................. H02M 7/537
　　　　　　　　　　　　　　　　　　　363/97
2017/0222574 A1*  8/2017 Lewis ............... H02M 7/53871

OTHER PUBLICATIONS

Michael Raj. P et al., "Voltage Balancing Control in Three Level Diode Clamped Inverter Using Carrier Based Offset Addition", IJIREEICE, XP055292414, DOI: 10.17148/ 1JIREEICE.2015. 3338, Mar. 15, 2015, pp. 164-167.

Kyoung-Pil Kang et al., "A Harmonic Voltage Injection Based DC-Link Imbalance Compensation Technique for Single-Phase Three-Level Neutral-Point-Clamped ( NPC) Inverters", Energies, vol. 11, No. 7, XP055730924, XP055730924, ISSN: 1996-1073, DOI: 10.3390/en11071886, Jul. 19, 2018, pp. 1-15.

Akagi H et al., "A 6.6- kV transformerless Statcom based on a five-level diode-clamped PWM converter: system design and experimentation of a 200-V, 10-KVA laboratory model", IEEE Cat., vol. 1, XP010842423, DOI: 10.1109/ IAS.2005.1518362, ISBN: 978-0-7803-9208-3, Oct. 2, 2005, pp. 557-564.

Europe Search Report/Office Action conducted in counterpart Europe Appln. No. 20170373.3 (Sep. 24, 2020).

Int'l Search Report (Form PCT/ISA/210) conducted in Int'l Appln. No. PCT/EP2021/060011 (Jul. 13, 2021).

Int'l Written Opinion (Form PCT/ISA/237) conducted in Int'l Appln. No. PCT/EP2021/060011 (Jul. 13, 2021).

* cited by examiner

METHOD FOR CONTROLLING A MULTILEVEL INVERTER WITH A SPLIT DC LINK

CROSS-REFERENCE TO RELATED APPLICATIONS

The present application is a U.S. National Stage of International Patent Application No. PCT/EP2021/060011 filed Apr. 19, 2921, and claims priority under 35 U.S.C. § 119(a) of Europe Patent Application No. 20170373.3 filed Apr. 20, 2020. Moreover, the disclosure of International Patent Application No. PCT/EP2021/060011 is expressly incorporated by reference herein in its entirety.

BACKGROUND OF THE INVENTION

1. Field of the Invention

The present invention pertains to a method for controlling a multilevel inverter having a DC link with at least two DC link capacitors that are connected to a switching stage with semiconductor switches for setting an output voltage or output current of the inverter according to a given setpoint value. The invention pertains also to such a multilevel inverter with an inverter control.

2. Discussion of Background Information

An inverter is a voltage converter that converts DC voltage (direct current voltage) from a DC power source into AC voltage (alternating current voltage). An inverter uses a switching stage to convert a DC voltage at the input into an AC voltage at the output. The DC voltage at the input is usually provided by a DC link that is connected to a DC power source. The DC power source can, for example, be a photovoltaic module, a battery energy storage, the output of an AC/DC or DC/DC converter, etc.

Also known are bidirectional inverters that allow energy flow in both directions, i.e. from input to output and vice versa.

There are many different well-known topologies for an inverter, e.g. multi-phase topologies or multi-level topologies. A multi-phase inverter provides a multi-phase output voltage, e.g. a three-phase output voltage. A multi-phase inverter has at least one switching leg in the switching stage for every phase. A switching leg usually comprises serially connected switching elements, like semiconductor switches, like IGBTs (insulated-gate bipolar transistor), MOSFETs (metal-oxide-semiconductor field-effect transistor) or GaN (Gallium Nitride), and an AC pole between high-side and low-side switching elements.

In a simple implementation, there are two switching elements in a switching leg that allow for two voltage levels at the AC pole. In more complex implementations, there are more than two switching elements serially connected in a switching leg which allows more than two voltage levels at the AC pole (multi-level).

The DC link may comprise a single capacitor but may, especially for a multi-level inverter, also comprise several capacitors connected in series (split DC link), e.g. two capacitors connected in series. The DC pole between the capacitors may be used as a neutral point and may be clamped in a multi-level inverter to the switching legs by semiconductor switches, like diodes (passive neutral point clamped inverter) or like transistors (e.g. IGBTs or MOSFETs) (active neutral point clamped inverter). The split DC link provides, e.g. a positive DC voltage that may be half of the DC voltage applied to the DC link and a negative DC voltage that may be half of the DC voltage applied to the DC link. The neutral point of the DC link between the serially connected capacitors may also be connected to a neutral point of a grid that is supplied by the inverter or to a star point or a neutral point of an output filter of the inverter. In operation of the inverter the DC voltages at the link capacitors of a split DC link should be balanced. Unbalanced DC link capacitor voltages cause unequal stress on the electrical components of the inverter, which can even lead to component and/or inverter failure, and also to a degradation of the output waveform quality, which may cause a detrimental increase in output voltage total harmonic distortion (THD). Hence, voltage imbalance between the DC voltage at the split DC link capacitors is undesirable. In order to mitigate voltage imbalance in a split DC link, different strategies have already been proposed.

One known strategy is based on additional hardware at the split DC link for voltage balancing. But this would increase costs and losses of the inverter. Other strategies are based on injection techniques as, for example, described in K Kang et al., "A Harmonic Voltage Injection Based DC-Link Imbalance Compensation Technique for Single-Phase Three-Level Neutral-Point-Clamped (NPC) Inverters", *MDPI Energies* 2018, 11, 1886. In this method an even harmonic signal, e.g. a second-order harmonic signal, is added to the reference signal which is generated by the current controller of the inverter. The reference signal with the even harmonic is then used by the switching controller to control switching of the semiconductor switches in the switching legs of the inverter. The even harmonic signal aims at balancing the DC link capacitors wherein the harmonics cause a voltage difference between the DC link capacitors to reduce voltage imbalance between the capacitors. The even harmonic signal is chosen to be directly proportional to the difference between the DC capacitor voltages, i.e. proportional to the voltage imbalance. With such a proportional gain the control behaviour of the voltage balancing control is however poor (e.g. remaining offset error, poor transient behaviour).

EP 2 876 793 A1 proposes a similar method which uses a third harmonic for modifying the reference signal of the inverter. The reference signal is modified, however, not for balancing the DC link voltages, but for minimizing the current stress of the DC link capacitors in order to increase their lifespan. Third-order harmonic signal is added to adjust the amplitude and/or the phase difference to minimize the current stress on both DC link capacitors.

SUMMARY

It is an object of the present invention to improve voltage balancing of a multi-level inverter with a split DC link.

This is achieved by calculating a modulation signal with a modulation signal amplitude as an even harmonic signal of the output voltage or the output current of the inverter. The modulation signal is calculated from an actual electric power difference of the actual electric powers at the at least two DC link capacitors and by superimposing the modulation signal onto the setpoint value for generating an adapted reference signal that is used for controlling switching of the semiconductor switches in order to balance the DC link capacitor voltages at the DC link capacitors. This approach allows to control the modulation signal such that the actual power difference of the DC link capacitors is compensated which in turn balances the DC link capacitor voltages. The modulation signal is therefore always adapted to the current power difference which improves the balancing of the DC link capacitor voltages. Apart from that, using power difference for calculating the modulation signal, it is possible to react even before the DC link voltages of the DC link capacitors change due to a power difference. By using power difference, it is known how the DC link voltage will change, which allows to influence this before the voltages change. Therefore, the transient behaviour of the voltage balancing control can be improved and the control error can be decreased. Last but not least, by using power instead of voltage for the balancing control, linear control theory can be applied as power has a linear influence on the change of electric energy over time in the DC link capacitors, that is in the end responsible for the voltage change.

Preferably, the actual power difference is calculated as an AC power difference of the AC powers provided by the DC link capacitors and optionally as sum of the AC power difference and a DC power difference of the DC link capacitors. By that, the actual power provided and consumed by the DC link capacitors is considered in calculating the modulation signal.

It is especially advantageous if a setpoint power difference is provided and if the modulation signal amplitude is calculated from a power difference error in form of the difference between the setpoint power difference and the sum of the actual power difference and the power difference at the DC link capacitors caused by the modulation signal. This allows to control the power difference and hence also the balancing based on a given setpoint power difference.

BRIEF DESCRIPTION OF THE DRAWINGS

The present invention is described in greater detail below with reference to the FIGS. 1 through 7, which show exemplary, schematic and non-limiting advantageous embodiments of the invention. The drawings show in FIG. 1 a known topology of an inverter with a split DC link, FIG. 2 an example of a three-phase multilevel inverter, FIG. 3 an example of a single-phase multilevel inverter, FIG. 4 the control scheme of the inverter with a balancing control, FIG. 5 the calculation of a modulation signal from an actual power difference, FIG. 6 the calculation of the setpoint power difference, and FIG. 7 an example of a second order even harmonic modulation signal.

DETAILED DESCRIPTION

Figure 1:
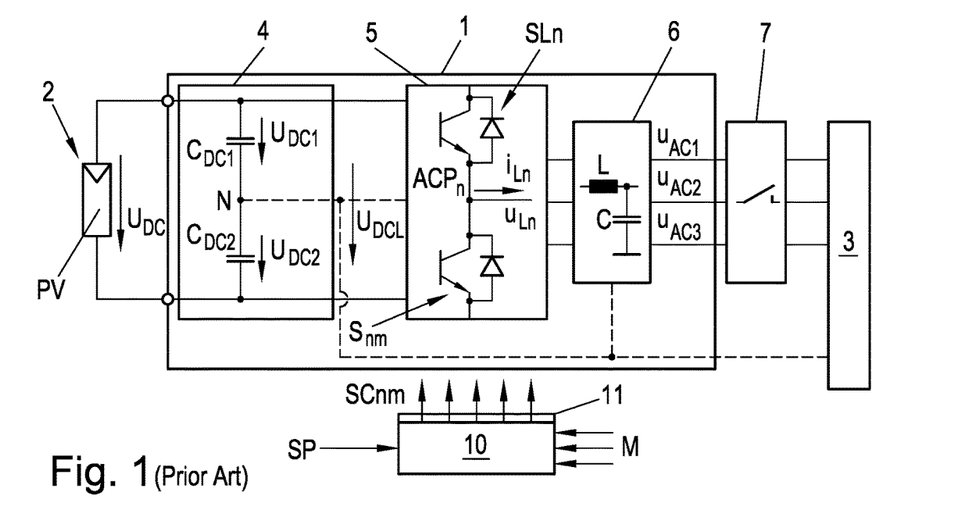

FIG. 1 exemplarily shows a typical design of an inverter 1 for converting DC voltage $U_{DC}$, for example, from a DC power source 2 which provides the DC voltage $U_{DC}$ to the input, into an AC voltage $u_{AC}$ at the output. In an embodiment of FIG. 1, the output voltage $u_{AC}$ is a three-phase output voltage $u_{AC}$ with phase voltages $u_{AC1}$, $u_{AC2}$, $u_{AC3}$. The AC output voltage $u_{AC}$ is provided to an electric load 3, e.g. an electric grid. In case of a balanced load, the phase voltages of the output voltage $u_{AC}$, e.g. $u_{AC1}$, $u_{AC2}$, $u_{AC3}$, can be assumed to be equal (besides a phase shift). The DC power source 2 can be any DC source, e.g. a photovoltaic module PV, as in FIG. 1, or a battery energy storage, a DC/DC converter, an AC/DC converter, etc. Although in FIG. 1 a three-phase inverter is shown, the inverter 1 may have any number of phases, including also only one phase. The inverter 1 could also be bidirectional, in which electric energy can be transferred from the input to the output and vice versa, i.e. input and output could be switched.

The inverter 1 comprises a DC link 4 at the input side of the inverter 1, a switching stage 5 and an optional AC filter 6 at the output side of the inverter 1. At the input of the inverter 1 there may also be provided a DC input filter (e.g. an EMC (electromagnetic compatibility) filter) and/or a DC/DC converter for raising the DC link voltage $U_{DCL}$. The optional AC filter 6 serves to smooth the AC output voltage $u_{AC}$ and AC output current $i_{AC}$ of the inverter 1 and may also comprise an EMC filter. Between the inverter 1 and the load 3, there may optionally be arranged an AC relay 7 which allows for disconnecting the inverter 1 from the load 3. The AC relay 7, if present, may also be integrated in the inverter 1.

The DC link 4 is implemented as split DC link having at least two DC link capacitors $C_{DC1}$, $C_{DC2}$ connected in series. Between two DC link capacitors $C_{DC1}$, $C_{DC2}$ a neutral point N is provided. The neutral point N could be connected to the neutral of the electric load 3, e.g. the neutral of the grid (as indicated in FIG. 1 in dashed lines) and/or could be clamped to the switching legs of the switching stage 5 by semiconductor switches (e.g. diodes as in FIG. 2 or transistors as in FIG. 3) in a multi-level inverter.

The DC link voltage $U_{DCL}$ is divided at the DC link 4 into a first DC link voltage $U_{DC1}$ at the high-side capacitor $C_{DC1}$ and a second DC link voltage $U_{DC2}$ at the low-side capacitor $C_{DC2}$. The neutral point N is between the high-side capacitor $C_{DC1}$ and low-side capacitor $C_{DC2}$. During operation of the inverter 1 the first DC link voltage $U_{DC1}$ and second DC link voltage $U_{DC2}$ may become unbalanced, i.e. $U_{DC1} \neq U_{DC2}$. In order to avoid this, a balancing control is implemented as described below.

Figure 2:
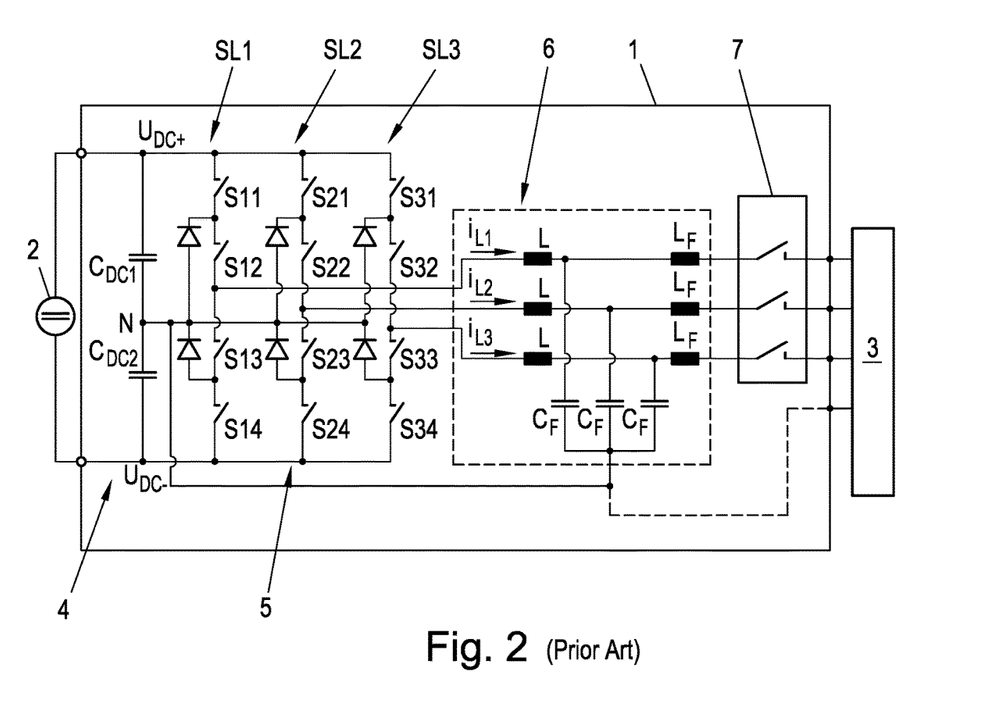
Figure 3:
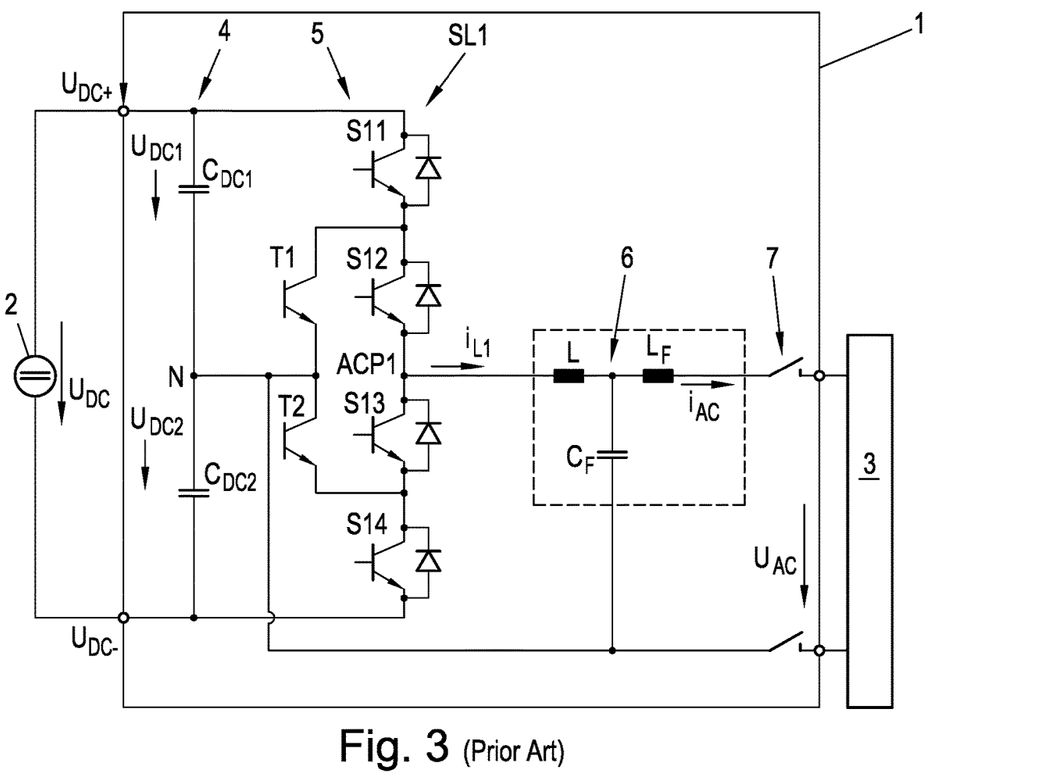

The switching stage 5 comprises a number n of switching legs SLn, n≥1, with at least one switching leg SLn for every phase, whereas each switching leg SLn is connected in parallel to the DC link 4, i.e. in parallel to the DC link voltage $U_{DCL}$. In each of the n switching legs SLn at least two semiconductor switches Snm, m≥2, are serially connected. Between semiconductor switches Snm of a switching leg SLn an AC pole ACPn is formed at which the output AC current $i_{Ln}$ and voltage $u_{Ln}$ of the switching leg SLn is provided. The AC pole ACPn is between the high-side and low-side switching elements Snm. The AC poles ACPn of several switching legs SLn of the switching stage 5 may also be connected to together form a phase of the output voltage $u_{AC}$. In a multi-level inverter, a switching leg SLn comprises several serially connected semiconductor switches Snm at the high-side and the low side. FIG. 2 and FIG. 3 show exemplary embodiments of multi-level inverter.

In the example of FIG. 2 a passive neutral point clamped three-phase multi-level inverter is shown with a split DC link 4 and a switching stage 5 having three switching legs SL1, SL2, SL3 (one per phase). In each switching leg SL1, SL2, SL3 two high-side semiconductor switches S11, S12, S21, S22, S31, S32 and two low-side semiconductor switches S13, S14, S23, S24, S33, S34 are connected in series. Between the high-side and low-side semiconductor switches Snm the AC poles ACP1, ACP2, ACP3 are formed. The high-side semiconductor switches Sn1, Sn2 and low-side semiconductor switches Sn3, Sn4 of each switching leg SLn are diode clamped to the neutral point N of the split DC link 4, i.e. the neutral point N is connected between the high-side and low-side semiconductor switches via diodes.

The AC voltages $u_{Ln}$ at the AC poles ACPn of a multi-level inverter can have more than two voltage levels, e.g. three voltage levels ($U_{DC+}$, 0, $U_{DC-}$) in the embodiment of FIG. 2. The AC leg currents $i_{L_n}$ provided at the AC poles ACPn of the switching legs SLn are usually filtered in an AC filter 6 by serially connected chokes L (inductors) in order to remove high frequency components of the AC waveforms. The chokes L may be followed by star-connected filter capacitors $C_F$ and serially connected filter inductors $L_F$. The star point of the star-connected filter capacitors $C_F$ may also be connected to the neutral point N of the DC link 4 (as indicated with dashed line in FIG. 2). The AC filter 6 may however also comprise additional or different filter stages. The neutral point N of the split DC link 4 may also be connected to the neutral line of the electric load 3 (as indicated with dashed line in FIG. 2).

FIG. 3 shows exemplarily an active neutral point clamped single-phase multi-level inverter 1. The switching leg SL1 comprises four semiconductor switches S11, S12, S13, S14 connected in series. The high-side semiconductor switches S11, S12 provide the positive AC waveform and the low-side semiconductor switches S13, S14 the negative AC waveform. Between the upper semiconductor switches S11, S12 and lower semiconductor switches S13, S14 the AC pole ACP1 is provided. The high-side semiconductor switches S11, S12 and low-side semiconductor switches S13, S14 are clamped to the neutral point N of the DC link 4 via semiconductor switches (e.g. transistors T1, T2). The neutral point N of the DC link 4 is in this case connected to the neutral line of the electric load 3.

A switching leg SLn of a multi-level inverter 1 may also have more than two semiconductor switches at the high-side and low-side for providing more voltage levels of the AC voltage $u_{L_n}$ and the AC pole ACPn. In this case, the DC link 4 may also have more than two serially connected DC link capacitors.

An inverter control 10 is used for operating the inverter 1 (FIG. 1). Different measurement values M, e.g. measured voltages and/or currents, of the inverter 1 may be used for controlling the inverter 1, e.g. the DC voltage $U_{DC}$, the DC link capacitor voltages $U_{CD1}$, $U_{CD2}$, the output voltage $u_{AC}$, the output current $i_{AC}$ or the AC leg currents $i_{L_n}$ at the AC poles ACPn, etc., as indicated in FIG. 1. Voltage and current sensors used for measuring the required measurement values M are well known and are not shown in FIG. 1 for the sake of simplicity.

In the inverter control 10 a switching control 11 is implemented that generates the control signals SCnm (indicated in FIG. 1) for switching the semiconductor switches Snm in the switching stage 5 at a given switching frequency and/or in a given order in order to generate the required output voltage $u_{AC}$ and/or output current $i_{AC}$ of the inverter 1. The control signals SCnm are usually provided to well-known gate driver (not shown) for each semiconductor switch Snm that effectuate the switching of the semiconductor switches Snm. The gate drivers could also be integrated in the switching control 11.

The inverter control 10 may be implemented on a microprocessor-based hardware, like a computer, microcontroller, digital signal processor, programmable logic controller (PLC), etc., that is programmed with control software for operating the inverter 1. The control software is stored in a memory of the inverter control 10. Also, implementations with an application-specific integrated circuit (ASIC) or a field-programmable gate array (FPGA), or the like, are possible. The inverter control 10 may also be implemented as analog circuit, analog computer or other analog instrumentation.

The switching control 11 and other functionalities of the inverter control 10 can be implemented as software that is run on the inverter control 10. The inverter control 10 and the switching control 11 could also be implemented as separate hardware. In this case the switching control 11 could also be microprocessor-based hardware, like a microcontroller, a computer, digital signal processor, programmable logic controller (PLC) etc., or an application-specific integrated circuit (ASIC) or Field-programmable gate array (FPGA), or the like, and with software. The switching control 11 may also be implemented as analog circuit, analog computer or other analog instrumentation The switching control 11 is often implemented as some kind of voltage modulation scheme, e.g. a PWM (pulse width modulation) or multi-level PWM scheme, that controls the pulse widths (duty cycles) of the AC leg voltages $u_L n$ at the AC poles ACPn and/or the voltage levels of the AC leg voltages $u_L n$ at the AC poles ACPn of the switching legs SLn. The average values over time of the AC leg voltage $u_L n$ and/or leg currents $i_{L_n}$ at the AC poles ACPn form the output voltage $u_{AC}$ and/or output current $i_{AC}$ of the multi-level inverter 1. The switching control 11 may however also be implemented differently.

The goal of the inverter control 10 is usually that the output voltage $u_{AC}$ and/or output current $i_{AC}$ correspond to a set reference output signal (setpoint value SP) of the inverter 1, e.g. an output voltage $u_{ACS}$ or output current $i_{ACS}$. In case of an electric grid as electric load 3 the reference output voltage $u_{ACS}$ is typically a sine voltage with a certain amplitude and grid frequency (e.g. 50 Hz), for example. The reference output signal, e.g. output voltage $u_{ACS}$ (also with multiple phase voltages and phase angles), may be provided to the inverter control 10 and/or switching control 11 as setpoint value SP of the control of the inverter 1 (FIG. 1, FIG. 4).

Figure 4:
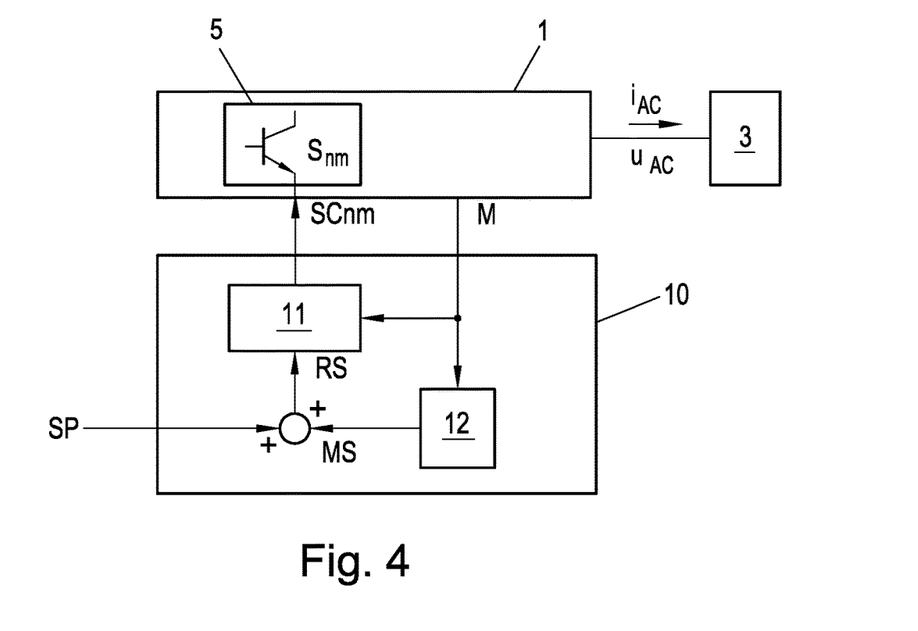

A balancing control 12 (e.g. software on the inverter control 10 or switching control 11 hardware), as shown in FIG. 4, determines a modulation signal MS that is superimposed on the setpoint value SP in order to generate an adapted reference signal RS for the switching control 11. The balancing control 12 could also be implemented separately from the inverter control 10, e.g. on a separate piece of hardware (microprocessor-based hardware, ASIC, FPGA, etc.) that may be programmed with balancing control software. The balancing control 12 could also be implemented as analog circuit, analog computer or other analog instrumentation.

The control goal of the balancing control 12 is to modulate the setpoint value SP with the modulation signal MS such that any voltage difference ($U_{DC1}$-$U_{DC2}$) between the DC link capacitor voltages $U_{DC1}$, $U_{DC2}$ is diminished. The voltage difference between the DC link capacitor voltages $U_{DC1}$, $U_{DC2}$ is produced during operation of the inverter 1 over time.

For the following explanations it is assumed that the DC link capacitors $C_{DC1}$, $C_{DC2}$ are the same, i.e. $C_{DC1}$=$C_{DC2}$=$C_{DC}$, although the following equations could easily be generalized for different DC link capacitors $C_{DC1}$, $C_{DC2}$. It is also assumed in the following that there are only two DC link capacitors $C_{DC1}$, $C_{DC2}$ in the split DC link 4. The following equations can however easily be generalized for more than two DC link capacitors $C_{DC1}$, $C_{DC2}$.

The invention is based on the consideration that the voltage difference ($U_{DC1}-U_{DC2}$) is caused by a difference of electric power at the DC link capacitors $C_{DC1}$, $C_{DC2}$. Different power P at the DC link capacitors $C_{DC1}$, $C_{DC2}$ leads to different changes of electric energy W in the DC link capacitors $C_{DC1}$, $C_{DC2}$ over time, as $$\frac{dW}{dt} = P.$$

The inventive balancing control 12 aims at compensating the difference of electric power at the DC link capacitors $C_{DC1}$, $C_{DC2}$ by properly controlling the modulation signal MS with the effect of balancing the DC link capacitor voltages $U_{DC1}$, $U_{DC2}$.

First, the actual value of the power difference $P_{diff,act}$ at the DC link capacitors $C_{DC1}$, $C_{DC2}$ is calculated. During operation of the inverter 1, there is DC power flowing into the capacitors $C_{DC1}$, $C_{DC2}$ of the DC link 4 and AC power flowing out of the capacitors $C_{DC1}$, $C_{DC2}$ of the DC link 4. The actual power difference $P_{diff,act}$ is the sum of the DC power difference $P_{diff,DC}$ and the AC power difference $P_{diff,AC}$, i.e. $P_{diff,act}=P_{diff,DC}+P_{diff,AC}$. The actual power difference $P_{diff,act}$ is therefore the current value of the difference of power at the DC link capacitors $C_{DC1}$, $C_{DC2}$. It is however possible not to consider the DC power difference $P_{diff,DC}$. In this case, the actual power difference $P_{diff,act}$ would be equal to the AC power difference $P_{diff,AC}$.

The difference of DC power $P_{diff,DC}$ of the DC powers flowing into the capacitors $C_{DC1}$, $C_{DC2}$ can be calculated as $P_{diff,DC}=I_{DC}(U_{DC1}-U_{DC2})$, with the DC link current $I_{DC}$ (that can be provided as measurement value M) being the DC current flowing through the DC link capacitors $C_{DC1}$, $C_{DC2}$. The DC link current $I_{DC}$ flows only on the DC side of the inverter 1.

The AC power difference $P_{diff,AC}$ of the AC powers taken from the DC link capacitors $C_{DC1}$, $C_{DC2}$ is the difference between the AC powers provided by the high-side capacitor $C_{DC1}$ and the low-side capacitor $C_{DC2}$. From the operation of an inverter 1 follows that the high-side capacitor $C_{DC1}$ provides power at a first (e.g. positive) halfwave of the output voltage $u_{AC}$ and output current $i_{AC}$ and the low-side capacitor $C_{DC1}$ provides power at a second (e.g. negative) halfwave of the output voltage $u_{AC}$ and output current $i_{AC}$.

The AC power of a given AC voltage $u_{AC}$ and AC current $i_{AC}$ is in general given as $$P_{AC} = f_N \int_0^{1/f_N} u_{AC} \cdot i_{AC} dt,$$

with the known frequency $f_N$ of the AC signal. This is the power averaged over a period $1/f_N$ of a cycle of AC voltage $u_{AC}$ and AC current $i_{AC}$.

An AC output voltage $u_{ACp}$ of a phase p of the AC output voltage $u_{AC}$ can be modelled as $u_{ACP}(\varphi_p)=U_A \sin(2\pi f_N t+\varphi_p)[+U_B \cos(2\pi f_N t+\varphi_p)]+(U_{DC1}-U_{DC2})$ with active voltage amplitude $U_A$ and phase angle $\varphi_p$. In the same way, the AC output current of a phase p of the active AC output current $i_{AC}$ can be modelled as $i_{ACP}(\varphi_p)=I_A \sin(2\pi f_N t+\varphi_p)[+I_B \cos(2\pi f_N t+\varphi_p)]$ with current amplitude $I_A$. Optionally (indicated by square bracket) also a blind component (with blind voltage amplitude Us and blind current amplitude Is) could be considered.

For a three-phase voltage and current, the phase angle $\varphi_p$ of the three phases can be set $$\varphi_p = \left[0, -\frac{120\pi}{180}, -\frac{240\pi}{180}\right],$$

which leads to the output voltage $$u_{AC} = \left[u_{AC1}(0) \quad u_{AC2}\left(-\frac{120\pi}{180}\right) \quad u_{AC3}\left(-\frac{240\pi}{180}\right)\right]^T$$

and output current $$i_{AC} = \left[i_{AC1}(0) \quad i_{AC2}\left(-\frac{120\pi}{180}\right) \quad i_{AC3}\left(-\frac{240\pi}{180}\right)\right]^T.$$

The voltage amplitudes $U_A$, $U_B$ and/or the current amplitudes $I_A$, $I_B$ are either known or may be provided as measurement values M.

The AC power difference $P_{diff,AC}$ of a phase p of an inverter 1 is then given by the difference of power of the first halfwave and the second halfwave AC voltage $u_{AC}$ and AC current $i_{AC}$. For a phase p with phase angle $\varphi_p=0$ the power difference can be calculated by $$P_{diff,ACp} = f_N \left(\int_0^{1/2f_N} u_{ACp} \cdot i_{ACp} dt - \int_{1/2f_N}^{1/f_N} u_{ACp} \cdot i_{ACp} dt\right).$$

For a phase p with phase angle $\varphi_p$ the bounds of integration need to be shifted by the phase angle $\varphi_p$, e.g. by $\frac{1}{3}f_N$ for a three-phase inverter 1, so that the halfwaves are correctly integrated. The AC power difference $P_{diff,AC}$ is then the sum of the single phase AC power differences as all phases p draw power from the DC link capacitors $C_{DC1}$, $C_{DC2}$, i.e.

$$P_{diff,AC} = \sum_p P_{diff,ACp}.$$

For a three-phase inverter 1 as shown in FIG. 2, $P_{diff,AC}$ can be calculated as $$P_{diff,AC} = -\frac{6}{\pi} I_A \frac{(U_{DC1} - U_{DC2})}{2},$$

for example.

The advantage of using the average power over a cycle of AC voltage $u_{AC}$ and AC current $i_{AC}$ is that it is possible to analytically solve the integral and to simply calculate AC power difference $P_{diff,AC}$ with the current values of AC voltage $u_{AC}$ and AC current $i_{AC}$, or their amplitudes $I_A$, $U_A$, respectively.

It would however also be possible to calculate the AC power difference $P_{diff,AC}$ from the instantaneous powers given by $P_{AC}=u_{AC}(t)\cdot i_{AC}(t)$.

Also in this case, the AC power difference $P_{diff,AC}$ is defined by the AC power difference taken by the DC link capacitors $C_{DC1}$, $C_{DC2}$, i.e. $P_{diff,AC}=P_{AC,C1}-P_{AC,C2}$. If the power is taken from DC link capacitor $C_{DC1}$ and no power is taken from DC link capacitor $C_{DC2}$, then $P_{diff,AC}=P_{AC,C1}-0=P_{AC,C1}$. Vice versa, if the power is taken from DC link capacitor $C_{DC2}$ and no power is taken from DC link capacitor $C_{DC1}$, then $P_{diff,AC}=0-P_{AC,C2}=-P_{AC,C2}$. If power is taken from both DC link capacitors $C_{DC2}$, $C_{DC2}$ then the AC power difference $P_{diff,AC}$ comprises power components of both DC link capacitors $C_{DC1}$, $C_{DC2}$.

This would however require more computing time and computing power, as the product of voltage and current would have to be calculated at every required point in time (e.g. every millisecond).

The overall actual power difference $P_{diff,act}$ between the DC link capacitors $C_{DC1}$, $C_{DC2}$ follow as sum of the DC power difference $P_{diff,DC}$ and the AC power difference $P_{diff,AC}$. This represents of course an instantaneous value of the power difference that can be calculated at given time steps, e.g. every millisecond. The DC power difference $P_{diff,DC}$ may for the inventive voltage balancing optionally be considered which leads to $P_{diff,act}=P_{diff,AC}[+P_{diff,DC}]$. This actual power difference $P_{diff,act}$ is to be compensated in order to balance the DC link capacitor voltages $U_{DC1}$, $U_{DC2}$.

Figure 7:
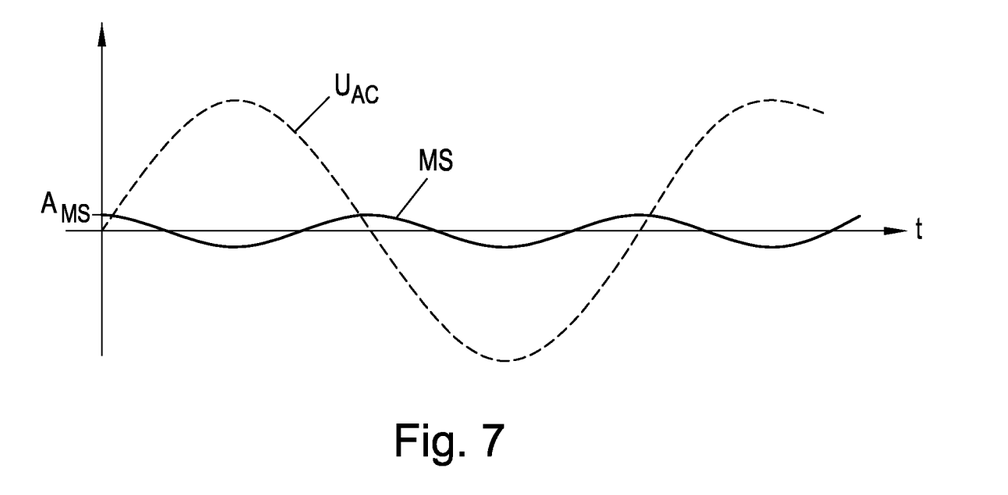

A proper modulation signal MS needs to be chosen that allows compensation of the power difference $P_{diff,act}$. The output voltage $u_{ACp}$ of a phase of the inverter 1 as output signal is usually a sine (or sine like) signal with frequency $f_N$ and amplitude $U_A$, i.e. $u_{ACp}=U_A \sin(2\pi f_N t+\varphi_p)$, with time t (as shown in FIG. 7). With such an output voltage $u_{ACp}$ an even order harmonic complementary trigonometrical signal, that is a cosine signal in case of a sine output signal or a sine signal in case of a cosine output signal, whose phase is synchronized to the output phase voltage $u_{ACp}$ is a good choice as modulation signal MS (FIG. 7) as such an even harmonic raises the power of a first halfwave of the output signal and lowers the power of a second half wave of the output signal. Analogously, a phase shifted corresponding trigonometrical signal (that is a sine signal in case of a sine output signal or a cosine signal in case of a cosine output signal), e.g. shifted by $-\pi/4$ for a second order even harmonic, would of course also do the job. This power difference at the DC link capacitors $C_{DC1}$, $C_{DC2}$ introduced by the modulation signal MS is used for compensating the power difference at the DC link capacitors $C_{DC1}$, $C_{DC2}$ and, hence, also for balancing the voltage difference of the DC link capacitor voltages $U_{DC1}$, $U_{DC2}$.

The n-th order even harmonic current $i_{hp}$ for a phase p with phase angle $\varphi_p$ is chosen for example as $i_{hp}=I_{nh}\cos(n2\pi f_N t+\varphi_p)[-I_{mh}\cos(m2\pi f_N t+\varphi_p)]$, with n being an even integer and $I_{nh}$ being the modulation signal amplitude $A_{MS}$. Optionally, as indicated in the square bracket, also uneven harmonic components could be considered, with m being an uneven integer. Uneven harmonics could be used for reducing the DC link voltage needed for generating the modulation signal MS.

For a three-phase inverter 1 the n-th order even harmonic current $i_h$ would for example follow as $$i_h(\varphi_p) = \begin{bmatrix} i_{h1}(0) & i_{h2}\left(-\frac{120\pi}{180}\right) & i_{h3}\left(-\frac{240\pi}{180}\right) \end{bmatrix}^T.$$

If uneven harmonic components were introduced with the modulation signal MS then these harmonics would also appear in the output voltage, which would lead to $$u_{ACp}(\varphi)=U_A \sin(2\pi f_N t+\varphi_p[+U_{mh} \sin(m2\pi f_N t+\varphi_p)][+U_B \cos(2\pi f_N t+\varphi_p)]+.$$

$$+(U_{DC1}-U_{DC2})$$

For the n-th order even harmonic current $i_h$ and the output voltage $u_{AC}$ of the inverter 1 the power difference $P_{diff,h}$ at the DC link capacitors $C_{DC1}$, $C_{DC2}$ that is caused by the n-th order even harmonic current $i_h$ as modulation signal MS can be calculated as described above for $P_{diff,AC}$. Therefore, the power difference $P_{diff,h}$ caused by the even harmonic current $i_h$ is again calculated as sum of the power differences between the positive and negative halfwaves of the p phases as described above.

For a $2^{nd}$ order harmonic current $i_h$ (n=2) the power difference $P_{diff,h}$ for a three-phase inverter 1 as in FIG. 2 can be calculated as $$P_{diff,h} = \frac{2}{5\pi}I_{nh}(-5U_A[+9U_{mh}]),$$

for example.

Figure 5:
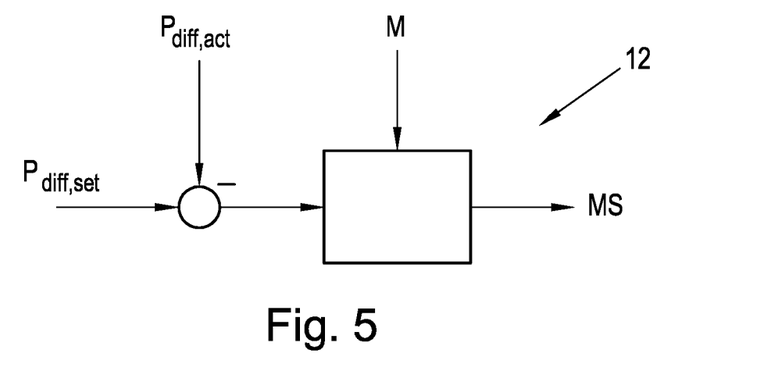

In order to be able to control the instantaneous power difference ($P_{diff,act}+P_{diff,h}$) at the DC link capacitors $C_{DC1}$, $C_{DC2}$ a setpoint power difference $P_{diff,set}$ is required, as shown in FIG. 5. The control goal would then be to compensate the power difference error [$P_{diff,set}-(P_{diff,act}+P_{diff,h})$], i.e. the control goal would be [$P_{diff,set}-(P_{diff,act}+P_{diff,h})$]=0. With the above equations the modulation signal amplitude $A_{MS}$, for instance the current amplitude $I_{nh}$ of the even n-th order harmonic current $i_h$ as modulation signal MS, could be calculated as $$I_{nh} = \frac{5\pi(P_{diff,set} - P_{diff,act})}{2(-5U_A[+9U_{mh}])},$$

for example.

It should be mentioned that analogously an even harmonic voltage signal uh with voltage amplitude $U_{nh}$ could also be used as modulation signal MS instead of the even harmonic current $i_h$.

In every time step of the balancing control 12 the amplitude of the modulation signal MS, either $I_{nh}$ or $U_{nh}$, could be calculated and the resulting modulation signal MS would be injected by superimposing the modulation signal MS onto the setpoint value SP of the inverter control in order to generate an adapted reference signal RS for the switching control 11 (FIG. 4).

The time step of the balancing control 12 does usually not correspond to the sampling time of the switching control 11. Usually, the sampling time of the switching control 11 would be much shorter than the time step of the balancing control 12. The amplitude of the modulation signal MS is preferably calculated periodically, for instance every 1 ms.

The superposition of the setpoint value SP and of the modulation signal MS can be done in different ways. It would be possible to add full periods (frequency fN) of the signals and the switching control 11 could sample the resulting signal with its switching frequency. It would also be possible that the setpoint values SP are provided at the switching frequency of the switching control 11 and the even harmonic modulation signal MS is sampled with the switching frequency for providing the modulation signal MS with a corresponding sampling rate.

For a multi-phase inverter 1, the setpoint value SP can of course be a vector with the number p of phases vector elements, i.e. a setpoint value for each phase p. The modulation signal MS would then be superimposed onto the setpoint value of each phase with the proper phase angle (pp.

As the difference of the DC link capacitor voltages $U_{DC1}$, $U_{DC2}$ is to be compensated, the setpoint power difference $P_{diff,set}$ is chosen to be a function of the DC link capacitor voltages $U_{DC1}$, $U_{DC2}$, i.e. $P_{diff,set}=f(U_{DC1}, U_{DC2})$.

Figure 6:
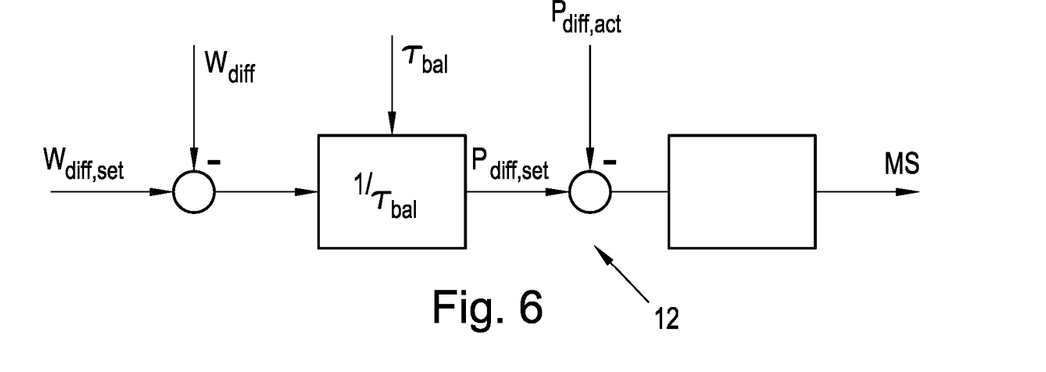

An advantageous way to calculate setpoint power difference $P_{diff,set}$ is shown with reference to FIG. 6.

The actual energy difference $W_{diff}$ between the DC link capacitors $C_{DC1}$, $C_{DC2}$ can be calculated as $$W_{diff} = \frac{(U_{DC1}^2 - U_{DC2}^2)C_{DC}}{2}.$$

The DC link capacitor voltages $U_{DC1}$, $U_{DC2}$ could be provided as measurement values M. Also a setpoint energy difference $W_{diff,set}$ is calculated with a setpoint DC link capacitor voltage difference $U_{diff,set}$ and the actual sum of the DC link capacitor voltages $U_{DC1}$, $U_{DC2}$ as $$W_{diff,set} = \frac{C_{DC}}{2} U_{diff,set}(U_{DC1} + U_{DC2}).$$

Usually the goal of the balancing control is $U_{diff,set}=0$ and consequently $W_{diff,set}=0$. With the error between the actual energy difference $W_{diff}$ and the setpoint energy difference $W_{diff,set}$ and with a chosen or given time constant $\tau_{bal}$ of the balancing control an electric power difference is calculated that is used as setpoint power difference $P_{diff,set}$, i.e.

$$P_{diff,set} = \frac{W_{diff,set} - W_{diff}}{\tau_{bal}}.$$

This gives a PI (proportional integral) controller characteristic of the balancing control 12, although also different control characteristics could be implemented as well. The time constant $\tau_{bal}$ can be seen as control parameter of the balancing control 12 that can be set appropriately to obtain the desired control behaviour and control stability of the balancing control 12. With this approach, the balancing control 12 would be implemented as cascaded control as shown in FIG. 6.

The calculation of the setpoint power difference $P_{diff,set}$ and of the modulation signal MS can be repeated in the given time step of the balancing control 12. Until the next calculation, the calculated modulation signal MS is superimposed on the setpoint value SP of the inverter control 10.

The invention claimed is:

1. A method for controlling a multilevel inverter having a DC link with at least two DC link capacitors that are connected to a switching stage with semiconductor switches for setting an output voltage or output current of the inverter according to a given setpoint value, comprising:
calculating a modulation signal with a modulation signal amplitude as an even harmonic signal of the output voltage ($u_{AC}$) or output current ($i_{AC}$) of the inverter, wherein the modulation signal is calculated from an actual electric power difference ($P_{diff,act}$) of actual electric powers at the at least two DC link capacitors ($C_{DC1}$, $C_{DC2}$); and
superimposing the modulation signal onto the setpoint value for generating an adapted reference signal that is used for controlling switching of the semiconductor switches in order to balance DC link capacitor voltages ($U_{DC1}$, $U_{DC2}$) at the DC link capacitors ($C_{DC1}$, $C_{DC2}$).

2. The method according to claim 1, wherein the actual power difference is calculated as an AC power difference of AC powers provided by the DC link capacitors ($C_{DC1}$, $C_{DC2}$).

3. The method according to claim 2, wherein the AC power difference is calculated as a difference of power of a first halfwave of the output voltage ($u_{AC}$) and output current ($i_{AC}$) and a second halfwave of the output voltage ($u_{AC}$) and output current ($i_{AC}$).

4. The method according to claim 2, wherein for a multi-phase inverter with p phases, the AC power difference is calculated as a sum of p single phase AC power differences.

5. The method according to claim 2, wherein the actual power difference is calculated as a sum of the AC power difference and a DC power difference ($P_{diff,DC}$) of the DC link capacitors ($C_{DC1}$, $C_{DC2}$).

6. The method according to claim 2, wherein the AC power difference is calculated from an average electric power over one cycle of the output voltage ($u_{AC}$) and the output current ($i_{AC}$) or as instantaneous power of the output voltage ($u_{AC}$) and the output current ($i_{AC}$).

7. The method according to claim 6, wherein the AC power difference of a phase p of the inverter is calculated as $$P_{diff,ACp} = f_N \left( \int_0^{1/2f_N} u_{ACp} \cdot i_{ACp} dt - \int_{1/2f_N}^{1/f_N} u_{ACp} \cdot i_{ACp} dt \right).$$

where $f_N$ is a known frequency, $u_{ACp}$, is an AC output voltage of phase p and $i_{ACp}$ is an AC output current of phase p.

8. The method according to claim 5, wherein the DC power difference ($P_{diff,DC}$) is calculated as $P_{diff,DC}=I_{DC}(U_{DC1}-U_{DC2})$, with a DC link current ($I_{DC}$) flowing through the DC link capacitors ($C_{DC1}$, $C_{DC2}$).

9. The method according to claim 1, wherein a setpoint power difference is provided and the modulation signal amplitude is calculated from a power difference error in form of the difference between the setpoint power difference and the sum of the actual power difference and a power difference at the DC link capacitors ($C_{DC1}$, $C_{DC2}$) caused by the modulation signal.

10. The method according to claim 9, wherein the setpoint power difference is chosen to be a function of the DC link capacitor voltages.

11. The method according to claim 9, wherein an actual electric energy difference ($W_{diff}$) between the DC link capacitors ($C_{DC1}$, $C_{DC2}$) is calculated, as $$W_{diff} = \frac{(U_{DC1}^2 - U_{DC2}^2)C_{DC}}{2},$$

wherein the DC link capacitors ($C_{DC1}$, $C_{DC2}$) are assumed the same so that $C_{DC}=C_{DC1}=C_{DC2}$, and a setpoint energy difference ($W_{diff,set}$) is calculated as $$W_{diff,set} = \frac{C_{DC}}{2} U_{diff,set}(U_{DC1} + U_{DC2})$$

with a given setpoint DC link capacitor voltage difference ($U_{diff,set}$), and the setpoint power difference ($P_{diff,set}$) is calculated from an energy error between the actual energy difference ($W_{diff}$) and the setpoint energy difference ($W_{diff,set}$).

12. The method according to claim 11, wherein the setpoint power difference ($P_{diff,set}$) is calculated from the energy error as $$P_{diff,set} = \frac{W_{diff,set} - W_{diff}}{\tau_{bal}},$$

with a known time constant $\tau_{bal}$ of the balancing control.

13. A multilevel inverter comprising:
a DC link with at least two DC link capacitors;
a switching stage with semiconductor switches that are connected to the DC link and
an inverter control for setting an output voltage or output current of the inverter according to a given setpoint value;
a balancing control is provided for calculating a modulation signal with a modulation signal amplitude as an even harmonic signal of the output voltage or output current of the inverter, where the balancing control calculates the modulation signal from an actual electric power difference of actual electric powers at the at least two DC link capacitors; and
a switching control is provided that receives an adapted reference signal for controlling switching of the semiconductor switches, where the adapted reference signal is generated by superimposing the modulation signal onto the setpoint value in order to balance DC link capacitor voltages at the DC link capacitors.

* * * * *